United States Patent Office 3,037,977
Patented June 5, 1962

3,037,977
PRODUCTION OF COMPOUNDS OF THE PYRIMIDINE SERIES
Herbert Maisack, Ludwigshafen (Rhine), Gartenstadt, Dietrich Peukert, Wesseling, and Willibald Schoenleben, Weinheim an der Bergstrasse, Germany, assignors to Badische Anilin- & Soda-Fabrik Aktiengesellschaft, Ludwigshafen (Rhine), Germany
No Drawing. Filed Oct. 23, 1959, Ser. No. 848,179
Claims priority, application Germany Oct. 25, 1958
2 Claims. (Cl. 260—239.75)

This invention relates to a new process for the production of compounds of the pyrimidine series of which some are new substances and useful pharmaceutical products.

It is already known from the German patent specification No. 951,990 that compounds of the pyrimidine series are obtained when aminovinylcarbonyl compounds of the general formula

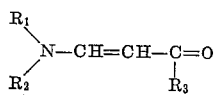

in which

represents the radical of a secondary amine and $R_3$ represents a hydrogen atom or an alkyl, aralkyl or aryl group, are reacted with compounds which contain the grouping

The aminovinyl carbonyl compounds necessary for the said condensation can be prepared for example by adding on a secondary amine to propargyl aldehyde or to an alpha-acetylene ketone. The beta-aminoacroleins, which are especially valuable for the production of the pyrimidine compounds, may also be obtained by allowing the reaction products of disubstituted formamides with inorganic acid chlorides, such as phosgene, thionyl chloride or phosphorus oxychloride, to react with alkenyl ethers, acetals or alpha-chlor ethers, and reacting the salt-like intermediate products thus formed with aqueous alkalies to form beta-aminoacroleins (Arnold and Sorm, Chem. Listy, 51 (1957), pages 1082 to 1090). This process is a modification of the aldehyde synthesis according to Vilsmeier and Haack.

When using dimethylformamide, phosgene and vinyl ethyl ether as initial materials, this reaction may be formulated as follows:

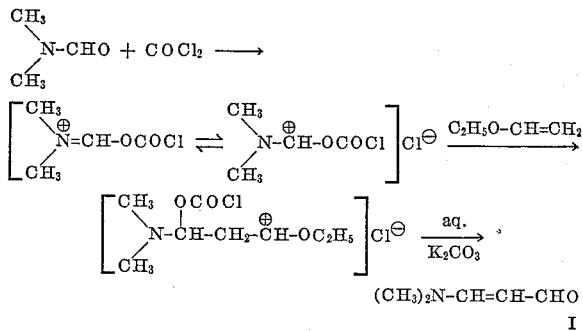

I

The salt like intermediate products which are obtained when starting from other formamides, inorganic acid chlorides and/or alkenyl ethers, aldehyde acetals or alpha-halogen ethers, such as are described in detail hereinafter, are analogous in constitution to the compound I and will hereinafter be referred to as "compounds of the type I."

It is the last stage of the said process, namely the decomposition of the compound of type I, which is attended by considerable waste. Thus for example beta-dimethyl-amino acrolein is obtained in a yield of only 68.5%.

The object of the present invention is to provide a process for the production of pyrimidine compounds which does not require any beta-aminoacrolein and in which therefore the last stage of the process according to Arnold and Sorm is avoided. Another object of the invention is the production of new pharmacologically active compounds. Further objects will hereinafter appear.

These objects are achieved by reacting a compound of type I obtainable by the reaction of a formamide with an inorganic acid chloride and an alkenyl ether, aldehyde acetal or alpha-halogen ether, with a compound of the general formula

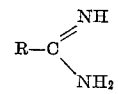

II in which R represents hydrogen, sulfhydryl or an amino group or an amino group substituted by an acyl, sulfonyl, cyanide or carbonamide radical —$CO \cdot NH_2$, or with a salt of such a compound in the presence of a basic condensing agent, preferably at a temperature between 50° and 150° C.

For example if the above mentioned salt like intermediate product I be reacted with guanidine as the compound of Formula II, the reaction may be formulated as follows:

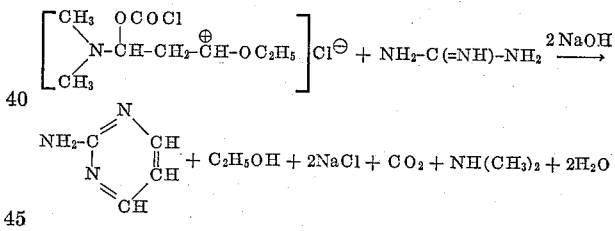

It is surprising that the compounds of the type I could be reacted with compounds of the general Formula II to form pyrimidines because hitherto only the reaction starting from beta-aminoacroleins or beta-aminovinyl ketones was known.

For the production of the salt like intermediate products of the type I, N,N-disubstituted formamides are used. The substitutents can be aliphatic or aromatic or members of a heterocyclic ring containing the amide nitrogen atom. Those formic acid amides are preferred which are substituted by two lower alkyl radicals or by a lower alkyl radical and an aromatic radical, especially a phenyl radical, and those in which the substituents are members of a heterocyclic 5 to 7 membered ring containing the ring nitrogen atom. Lower alkyl radicals here and throughout this specification means those with 1 to 4 carbon atoms. Suitable acid amides are for example N,N-dimethylformamide, N,N-diethylformamide, N,N,-dibutylformamide, N-formyl-N-methylaniline, N-formyl-pyrrolidine, N-formylpentamethylene imine and N-formylhexamethylene imine.

Of the inorganic acid chlorides, phosphorus oxychloride, thionyl chloride and especially phosgene are suitable.

The reaction products of the said N,N-disubstituted formamides with one of the said inorganic acid chlorides may be reacted with a vinyl ether, an aldehyde acetal or an alpha-halogen ether.

By alkenyl ethers we understand compounds which contain the grouping —O—CH=CH—. They have a saturated radical and an unsaturated radical joined together by an oxygen bridge. The saturated radical may be an alkyl, cycloalkyl, aralkyl or aryl radical. Since the saturated radical is no longer present in the reaction product, i.e. in the pyrimidine derivative, it is not of great importance which of the above specified saturated radicals the alkenyl ether contains. The alkenyl ethers with a lower alkyl radical are however preferred. The unsaturated radical of the alkenyl ethers is in the simplest case the vinyl grouping —CH=CH$_2$. It may however also be substituted in beta-position to the oxygen, preferably by an alkyl radical and especially by a lower alkyl radical. This substituent in beta-position to the ether oxygen atom is present in the end product, i.e. the pyrimidine derivative, as a substituent in the 5-position. Suitable alkenyl ethers are for example vinyl methyl ether, vinyl ethyl ether, vinyl isobutyl ether, propenyl ethyl ether and pentene-(1)-yl-(1) ethyl ether.

The aldehyde acetals which may be used instead of the alkenyl ethers for the production of the salt like intermediate products of type I are preferably derived from saturated aliphatic aldehydes with 3 to 10 carbon atoms. They are advantageously acetalized with lower saturated aliphatic alcohols with 1 to 4 carbon atoms. Suitable aldehyde acetals are for example propionaldehyde diethyl acetal, butyraldehyde diethyl acetal, isobutyraldehyde dimethyl acetal, isovaleraldehyde diethyl acetal and nonylaldehyde dibutyl acetal.

Finally there can also be used alpha halogen ethers instead of alkenyl ethers or aldehydacetals for the production of the salt like intermediate products of type I. Of the alpha-halogen ethers, the alpha-chlor ethers are preferred. The preferred alpha-chlor ethers are those containing a lower alkyl radical on the one hand and an alpha-chloralkyl radical with from 2 to 10 carbon atoms on the other hand.

The salt-like compounds of type I thus have following general formula

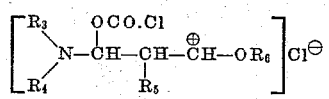

in which $R_3$, $R_4$, $R_5$ and $R_6$ have the meanings suggested in the detailed description of the starting materials for the production of the compounds of type I, to wit $R_3$ and $R_4$ denote aliphatic and/or aromatic radicals or substituents which are common members of a heterocyclic ring with the amide nitrogen atom as a ring member. $R_3$ and $R_4$ preferably stand for lower alkyl radicals or phenyl radicals or for substituents forming with the amide nitrogen atom a ring with from 5 to 7 members. $R_5$ denotes an alkyl radical, more specifically an alkyl radical with up to 8 carbon atoms. $R_6$ denotes an alkyl, cycloalkyl, aralkyl or aryl radical, preferably a lower alkyl radical. For the production of the salt-like compounds of type I, the formamide is reacted, preferably dissolved in a solvent as a rule at room temperature with the inorganic acid chloride. Suitable solvents for the formamide are for example benzene, toluene, chloroform, 1,2-dichlorethane, chlorbenzene and methylene chloride. The formamide and the acid chloride are used in molar amounts or preferably one of the components is used in an excess of up to about 25%. The intermediate compound formed from the formamide and the acid chloride may remain dissolved or be precipitated in crystalline form.

The dissolved or suspended intermediate compound is then reacted with the gaseous, liquid or solvent-dissolved alkenyl ether, aldehyde acetal or alpha-halogen ether at temperatures below 70° C., preferably below 50° C. As a rule, molar amounts of alkenyl ether, aldehyde acetal or alpha-halogen ether are used but in many cases a slight excess or deficiency, for example a deficiency of 5% with reference to formamide, is advantageous. The salt like intermediate product of type I thus formed may remain dissolved or precipitate in crystalline form.

To the reaction mixture there is then added the compound of the general Formula II. Among those compounds of Formula II in which R represents an aromatic radical, benzamidine is preferred. The most important reaction components of the general Formula II are those which contain a substituted amino group. Of the acylguanidines, those which are derived from lower saturated aliphatic carboxylic acids, for example, from acetic acid, propionic acid and butyric acid, are preferred. Among those compounds in which R represents an amino group substituted by a sulfonyl radical, those are most important which contain the radical of an aromatic sulfonic acid, especially a substituted benzenesulfonic acid. Such radicals are for example the para-aminobenzenesulfonamide radical and the para-acetaminobenzenesulfonamide radical. Instead of the compounds of the general Formula II salts thereof, such as the hydrohalides or hydrosulfates or, preferably, the hydrochlorides may may also be employed. Of the compounds of the general Formula II the following examples are given: Formamidine, acetamidine, benzamidine, thiourea, acetylguanidine, para-toluenesulfonylguanidine, para-nitrobenzenesulfonylguanidine, para - acetylaminobenzenesulfonylguanidine, para-aminobenzenesulfonylguanidine, dicyandiamide and dicyandiamidine.

Suitable basic condensing agents are inter alia the hydroxides and oxides of the alkali and alkaline earth metals, and especially advantageously alkali alcoholates, acetylides and amides. There may be used for example sodium hydroxide, sodium methylate, magnesium ethylate, potassium tertiary butylate, barium hydroxide, sodamide and sodium acetylide.

In the condensation of the compound of the type I with the compound of the general Formula II, the latter is used in about the stoichiometrical amount, but preferably in a deficiency of up to 20% with reference to the formamide used for the production of the compound of the type I. Especially suitable organic liquids in which the condensation may be carried out are lower saturated alcohols with up to about 5 carbon atoms, such as methanol, ethanol, isobutanol, isopropanol and amyl alcohols. Other useful liquids are hydrocarbons, such as cyclohexane, benzene, toluene and xylene, and ethers, such as tetrahydrofurane, dioxane and dibutyl ether. When an aliphatic chlorohydrocarbon has been used in the preparation of the salt-like intermediate product of the type I as solvent, it is preferable to remove this prior to the addition of the basic condensing agent. It is preferable to distil off the aliphatic chlorohydrocarbon after the addition of the liquid in which the condensation of the intermediate product of the type I and the compound of the general Formula II is to be carried out, to the solution or suspension of the intermediate product of type I.

The condensation is effected by adding the condensing agent which likewise is preferably dissolved in a lower saturated aliphatic alcohol with up to 5 carbon atoms, to the mixture of the intermediate product of type I and the compound of the general Formula II.

Of the condensing agents there are required at least as many equivalents as correspond to the strong and medium strong acids, which would be formed by hydrolysis of the acid chloride used in the production of the salt-like compound of the type I. Thus for example when using phosgene, two equivalents, and when using phosphorus oxychloride, 4 equivalents of basic condensing agent are needed per mol of acid chloride. When the compound of the general formula II is used in the form of a salt, for example the hydrochloride, there is correspondingly required one further equivalent of the basic condensing agent. The condensation is preferably carried out at temperatures between 50° and 150° C. The condensation product is recovered in the usual way, for example by evaporation of the solvent and crystallization of the residue.

The products obtainable by the method of our invention generally are high quality intermediates, for example for the production of pharmaceuticals and dyestuffs. When containing a benzene sulfonamide radical which is substituted in the nucleus, they are by themselves valuable pharmaceuticals for use against bacterial infections. A few among the new compounds, such as 2-(para-aminobenzenesulfonyl)-amino-5-isopropyl pyrimidine and 2-(para-aminobenzenesulfonyl)-amino-5-heptyl pyrimidine, are particularly remarkable for having a more favorable therapeutic action in many a respect than known compounds of the same series.

The following examples will further illustrate this invention but the invention is not restricted to these examples. The parts specified in the examples are parts by weight.

*Example 1*

A solution of 133 parts of phosgene in 120 parts of dry benzene is added to a mixture of 100 parts of dimethylformamide and 250 parts of dry benzene with stirring and external cooling. The whole is stirred for another hour and then a solution of 102 parts of vinyl ethyl ether in 100 parts of dry benzene is allowed to flow into the mixture. The temperature is at first kept at 30° C. and towards the end at 50° C.

At 20° C. there is added to the mixture a solution of 73 parts of sodium methylate in 150 parts of methanol, then 209 parts of benzamidine hydrochloride and finally another 146 parts of sodium methylate dissolved in 300 parts of methanol. The mixture is then heated for 5 hours under reflux, the mixture filtered free from the deposited sodium chloride by suction while still hot and the latter washed with methanol. The washing liquid and the filtrate are united, the methanol and the benzene evaporated and the residue distilled under reduced pressure. 168 parts of 2-phenyl-pyrimidine of the boiling point 117° to 119° C. are obtained. The distillate solidifies to crystals of the melting point 38° to 39° C. The yield is 81% of the theory.

*Example 2*

198 parts of phosgene are led into a solution of 146 parts of dimethylformamide in 1,000 parts of chloroform at 10° to 15° C. with stirring and external cooling. Then, while further cooling at 0° to 10° C., a solution of 144 parts of vinyl ether in 200 parts of chloroform is added to the mixture within 4 hours and the latter then kept for another 4 hours at room temperature.

190 parts of guanidine hydrochloride are added and the solvent removed, at first under normal pressure and towards the end under reduced pressure. To the residue there is added a solution of 340 parts of sodium methylate in 800 parts of absolute alcohol and heated for 3 hours under reflux. The hot mixture is filtered and the alcohol distilled off from the filtrate. The residue is exhaustively extracted with methylene chloride. After evaporating the solvent, 143 parts of 2-aminopyrimidine are obtained, corresponding to 75% of the theory.

*Example 3*

Into a mixture of 73 parts of dimethyl formamide and 300 parts of benzene there is allowed to flow, while cooling and stirring, a solution of 110 parts of phosgene in 150 parts of benzene. The mixture is stirred for some hours at room temperature and then a solution of 72 parts of vinyl ethyl ether in 100 parts of benzene is added to the mixture. The temperature thereby rises and after all has been added is kept at 70° C. for 20 minutes.

To the mixture at room temperature there are then added first 180 parts of a 30% solution of sodium methylate in methanol, then 76 parts of thiourea and finally another 180 parts of a 30% sodium methylate solution. The product is heated for 12 hours at 65° C., filtered by suction while still hot and the solvent evaporated from the filtrate. 78 parts of 2-mercaptopyrimidine of the melting point 240° C. (with decomposition) are obtained. The yield is 70% of the theory.

*Example 4*

A solution of 110 parts of phosgene in 145 parts of methylene chloride is allowed to flow at 0° C. into a mixture of 73 parts of dimethylformamide and 400 parts of methylene chloride. After allowing to stand for several hours, 68 parts of ethyl vinyl ether, diluted with 133 parts of methylene chloride, are slowly added the mixture thereby boiling. Then 315 parts of methanol are added thereto and the methylene chloride distilled off. A solution of 180 parts of potassium hydroxide in 425 parts of methanol and 78 parts of guanidine hydrochloride are then added. The whole is boiled for 12 hours under reflux, filtered by suction and the methanol distilled off from the filtrate. The residue, after recrystallization from toluene, yields 62 parts of 2-aminopyrimidine, corresponding to 80% of the theory.

*Example 5*

The procedure of Example 4 is followed but 176 parts of sulfaguanidine are added instead of guanidine hydrochloride. After the usual working up there are obtained 165 parts of pure sulfadiazine, corresponding to 80% of the theory.

*Example 6*

The procedure of Example 4 is followed except that 70 parts of dicyandiamide and 360 parts of a 30% sodium methylate solution are added instead of the guanidine hydrochloride. After heating for 8 hours under reflux, the methanol is distilled off in vacuo, the solid residue dissolved in 300 parts of water and the solution brought to a pH of 4.5 with hydrochloric acid. The precipitate formed is recrystallized from hot water. 70 parts of pyrimidylcyanamide of the melting point 261° C. are obtained, corresponding to a yield of about 70% of the theory with reference to dicyandiamide.

*Example 7*

The procedure of Example 4 is followed with the exception that 125 parts of dicyandiamidine sulfate and 450 parts of a 30% sodium methylate solution are added instead of the guanidine hydrochloride. After stirring for 8 hours under reflux, deposited sodium sulfate is filtered off by suction and the methanol distilled off from the filtrate in vacuo. The residue is recrystallized from hot water. 75 parts of pyrimidylurea are obtained, corresponding to 67% of the theory. The melting point is 231° C.

*Example 8*

A solution of 110 parts of phosgene in 145 parts of methylene chloride is stirred while cooling into a mixture of 73 parts of dimethylformamide and 200 parts of methylene chloride. After allowing to stand for several hours, 80 parts of propenyl ethyl ether, diluted with 150 parts of methylene chloride, are allowed to flow in, the mixture thereby beginning to boil. 315 parts of methanol are added, the methylene chloride is distilled off, 180 parts of a 30% sodium methylate solution, 182 parts of sulfaguanidine and another 360 parts of sodium methylate solution are added and the mixture boiled under reflux for 10 hours. After the usual working up, 168 parts of 2-(para-aminobenzenesulfonyl)-amino - 5 - methylpyrimidine are obtained, corresponding to 75% of the theory with reference to sulfaguanidine.

*Example 9*

A solution of 110 parts of phosgene in 140 parts of ethylene chloride is stirred while cooling into a mixture of 73 parts of dimethylformamide and 190 parts of ethylene chloride. After allowing to stand for several hours, it is diluted with 190 parts of ethylene chloride and then 158 parts of propionaldehyde diethyl acetal are allowed to flow in. The whole is heated to boiling for 20 minutes, 320 parts of normal butanol are added and the ethylene chloride is distilled off. After adding 180 parts of sodium methylate solution (30%), 160 parts of sulfaguanidine and another 360 parts of sodium methylate solution, the mixture is heated for 10 hours at 70° C. After the usual working up there are obtained 125 parts of 2-(para-aminobenzenesulfonyl)-amino-5-methylpyrimidine, corresponding to 64% of the theory.

*Example 10*

The procedure of Example 9 is followed while using 175 parts of butyraldehyde diethyl acetal, instead of the propionaldehyde diethyl acetal, and 135 parts of 2-(para-aminobenzenesulfonyl)-amino-5-ethylpyrimidine are obtained, corresponding to 65% of the theory.

*Example 11*

The procedure of Example 9 is followed but with the employment of 190 parts of isovaleraldehyde diethyl acetal. 130 parts of 2-(para-aminobenzenesulfonyl)-amino-5-isopropylpyrimidine are obtained, corresponding to 60% of the theory.

*Example 12*

The procedure of Example 9 is followed, but while using 325 parts of nonylaldehyde dibutyl acetal. 143 parts of 2-(para-aminobenzenesulfonyl)-amino-5-heptylpyrimidine are obtained, corresponding to 55% of the theory.

*Example 13*

154 parts of phosphorus oxychloride are added to a solution of 73 parts of dimethyl formamide in 250 parts of benzene at room temperature and the mixture is heated for one hour under reflux. After cooling 86 parts of vinylethyl ether are added, the temperature being allowed to rise to 60° C. While cooling again, there are added a solution of 160 parts of sodium methylate in 380 parts of methanol, then 95 parts of guanidine hydrochloride and again a solution of 100 parts of sodium methylate in 225 parts of methanol. The mixture is heated for 5 hours under reflux and then filtered off by suction from the deposited sodium chloride while still hot, the solvent mixture being removed from the filtrate by distillation. By extracting the residue with methylene chloride 40 parts of 2-aminopyrimidine (melting point 124°–128° C.) are obtained.

*Example 14*

60 parts of thionyl chloride are run into a solution of 37 parts of dimethyl formamide in 160 parts of benzene. After allowing the reaction mixture to stand for 2 hours, there are successively added 40 parts of vinylethyl ether at a temperature of between 30 and 60° C.; 50 parts of guanidine hydrochloride and then, while cooling, a solution of 152 parts of sodium methylate in 350 parts of methanol. The mixture is heated to and kept at, the boil for another 6 hours and then processed as described in Example 13. There are obtained 42 parts of 2-aminopyrimidine.

*Example 15*

A solution of 50 parts of phosgene in 160 parts of benzene is stirred into a solution of 67 parts of N-methylformanilide in 160 parts of benzene and, after further stirring the mixture for 1 hour at room temperature 57 parts of vinylethyl ether are added. There are further added to the mixture 50 parts of guanidine hydrochloride and, while cooling, a solution of 108 parts of sodium methylate in 220 parts of methanol. The mixture is heated for 6 hours under reflux and then further processed as described in Example 13. There are obtained 10 parts of 2-aminopyrimidine.

*Example 16*

A solution of 50 parts of phosgene in 150 parts of benzene is stirred, while cooling into a solution of 55 parts of N-formylpyrrolidine in 250 parts of benzene. After further stirring for one hour 40 parts of vinylmethyl ether are added in gas form at between 15° and 20° C., stirring then being continued for 30 minutes, at the end of which 50 parts of guanidine chloride and following this a solution of 40 parts of sodium in 650 parts of absolute alcohol are added. After heating for 6 hours under reflux, the mixture is further processed as described in Example 13. There are obtained 30 parts of 2-aminopyrimidine.

*Example 17*

A solution of 50 parts of phosgene in 150 parts of benzene is stirred, while cooling, into a solution of 37 parts of dimethyl formamide in 200 parts of benzene. After further stirring the mixture for one hour 60 parts of vinylisobutyl ether are dripped in, the temperature being kept at 20° C. at the start and then allowed to rise to 70° C. toward the close of the vinylisobutyl ether addition. After cooling 50 parts of guanidine hydrochloride and finally, while cooling a solution of 68 parts of potassium tert. butoxide in 500 parts of isobutanol are added. After heating for 6 hours under reflux, the mixture is further processed as described in Example 13. There are obtained 10 parts of 2-aminopyrimidine.

*Example 18*

A solution of 50 parts of phosgene in 200 parts of benzene is dripped into a solution of 64 parts of N-formylhexamethylene imine in 250 parts of benzene with agitation, while cooling. After allowing the mixture to stand for several hours 57 parts of propenylethyl ether are added at 30° C. Stirring is then continued for one hour and then 50 parts of guanidine hydrochloride and finally a suspension of magnesium ethylate prepared from 22 parts of magnesium and 600 parts of absolute alcohol are added. The mixture is then heated for 6 hours under reflux and further processed as described in Example 13. After recrystallization from toluene 30 parts of 2-amino-5-methylpyrimidine are obtained which melt at between 192° and 193° C.

*Example 19*

A solution of 60 parts of phosgene in 200 parts of dioxane is run into a solution of 94 parts of di-n-butylformamide in 350 parts of dioxane with agitation, while cooling. The suspension thus formed is stirred at room temperature for several hours and then 60 parts of vinylethyl ether are added at 40° C. To the clear solution obtained 50 parts of guanidine hydrochloride and following this 145 parts of extremely fine calcium carbide are added. The mixture is then heated for 6 hours under reflux and filtered while still hot. The solvent is removed from the filtrate by distillation and the oily residue is distilled under reduced pressure. There are obtained 20 parts of a semi-liquid distillate from which 10 parts of 2-aminopyrimidine are filtered off by suction.

*Example 20*

A solution of 110 parts of phosgene in 140 parts of ethylene chloride is stirred, while cooling, into a mixture of 73 parts of dimethyl formamide and 190 parts of ethylene chloride. After standing for several hours, the reaction mixture is diluted with 190 parts of ethylene chloride and, after adding 136 parts of alpha-chlorethyl butyl ether at a temperature of between 70° and 80° C., heated to the boil for 20 minutes. After adding 320 parts of butanol the ethylene chloride is distilled under reduced pressure. The distillate is then neutralized with a 30% solution of technical-grade sodium methylate and then 170 parts of sulfaguanidine and 360 more parts of sodium methylate solution are added. The reaction mixture is then heated to and kept at, a temperature of 70° C. for 10 hours. By further processing in conventional manner 140 parts of sulfadiazine are obtained.

*Example 21*

A solution of 110 parts of phosgene in 140 parts of ethylene chloride is stirred, while cooling, into a mixture of 73 parts of dimethyl formamide and 190 parts of ethylene chloride. After standing for several hours, the reaction mixture is diluted with 190 parts of ethylene chloride, and, after adding 150 parts of alpha-chlorpropyl butyl ether at a temperature of between 70° and 80° C., heated at the boil for 20 minutes. After adding 320 parts of butanol the ethylene chloride is distilled under reduced pressure. The residue is then neutralized with a 30% solution of technical-grade sodium methylate and then 170 parts of sulfaguanidine and 360 parts of sodium methylate solution are added. The reaction mixture is then heated to and kept at, a temperature of 70° C. for 10 hours. By further processing in conventional manner 140 parts of 5-methylsulfadiazine are obtained.

*Example 22*

A solution of 110 parts of phosgene in 140 parts of ethylene chloride is stirred, while cooling, into a mixture of 73 parts of dimethyl formamide and 190 parts of ethylene chloride. After standing for several hours, the reaction mixture is diluted with 190 parts of ethylene chloride and, after adding 170 parts of alpha-chlorisopentenyl butyl ether at a temperature of between 70° and 80° C., heated at the boil for 20 minutes. After adding 320 parts of butanol the ethylene chloride is distilled under reduced pressure. The residue is then neutralized with a 30% solution of technical-grade sodium methylate and then 170 parts of sulfaguanidine and 360 more parts of sodium methylate solution are added. The reaction mixture is then heated to and kept at, a temperature of 70° C. for 10 hours. By further processing in conventional manner 125 parts of 5-isopropylsulfadiazine are obtained.

*Example 23*

A solution of 110 parts of phosgene in 140 parts of ethylene chloride is stirred, while cooling, into a mixture of 73 parts of dimethyl formamide and 190 parts of ethylene chloride. After standing for several hours, the reaction mixture is diluted with 190 parts of ethylene chloride and, after adding 234 parts of alpha-chlorononyl butyl ether at a temperature of between 70° and 80° C., heated at the boil for 20 minutes. After adding 320 parts of butanol the ethylene chloride is distilled under reduced pressure. The residue is then neutralized with a 30% solution of technical-grade sodium methylate and then 170 parts of sulfaguanidine and 360 more parts of sodium methylate solution are added. The reaction mixture is then heated to and kept at, a temperature of 70° C. for 10 hours. After distilling off the solvent and further processing in conventional manner 115 parts of 5-heptylsulfadiazine are obtained.

What we claim is:

1. In a process for the production of compounds of the pyrimidine series wherein a salt-like compound is obtained by the interaction of an N,N-disubstituted formamide with an acid chloride selected from the group consisting of phosgene, phosphorus oxychloride and thionyl chloride and with a compound selected from the group consisting of alkenyl ethers containing the group

aldehyde acetal and alpha-chlor ethers, the improvement which comprises heating said salt-like compound at a temperature of about 50° to 150° C. with a compound of the general formula

in which R represents a member of the group consisting of hydrogen, sulfhydryl, amino, acylated amino, sulfonylated amino, cyanoamino, said amino substituted by carbon amido and the salts of said compounds, in the presence of a basic condensation agent.

2. A process as claimed in claim 1 wherein the reaction is carried out in a lower saturated aliphatic alcohol with up to 5 carbon atoms.

References Cited in the file of this patent

UNITED STATES PATENTS

| | | |
|---|---|---|
| 2,407,966 | Sprague | Sept. 17, 1946 |
| 2,778,821 | Pasedach et al. | Jan. 22, 1957 |

FOREIGN PATENTS

| | | |
|---|---|---|
| 569,140 | Great Britain | May 7, 1945 |
| 883,537 | France | Mar. 29, 1953 |

OTHER REFERENCES

Northey: The Sulfonamides and Allied Compounds, Reinhold Pub. Co., New York, pages 77–78 (1948).